(12) United States Patent
Morita et al.

(10) Patent No.: US 9,457,679 B2
(45) Date of Patent: Oct. 4, 2016

(54) CHARGE CONTROL DEVICE, CHARGE CONTROL METHOD, AND CHARGE CONTROL SYSTEM

(71) Applicant: MITSUBISHI HEAVY INDUSTRIES, LTD., Tokyo (JP)

(72) Inventors: Katsuaki Morita, Tokyo (JP); Toshihiko Niinomi, Tokyo (JP); Takayuki Kono, Tokyo (JP); Kazuyuki Wakasugi, Tokyo (JP); Hisashi Motoyama, Tokyo (JP); Masato Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/767,800

(22) PCT Filed: Mar. 27, 2014

(86) PCT No.: PCT/JP2014/059015
§ 371 (c)(1),
(2) Date: Aug. 13, 2015

(87) PCT Pub. No.: WO2014/162989
PCT Pub. Date: Oct. 9, 2014

(65) Prior Publication Data
US 2015/0375632 A1    Dec. 31, 2015

(30) Foreign Application Priority Data
Apr. 1, 2013  (JP) .................................. 2013-076388

(51) Int. Cl.
*B60L 11/18*     (2006.01)
*B60L 3/00*      (2006.01)

(52) U.S. Cl.
CPC .......... *B60L 11/1838* (2013.01); *B60L 3/0046* (2013.01); *B60L 11/1816* (2013.01);
(Continued)

(58) Field of Classification Search
CPC ............ B60L 11/1838; B60L 11/1816; B60L 11/1861; B60L 3/0046; B60L 2240/545; B60L 2240/547; B60L 2240/549; B60L 2260/52; B60L 2260/54; B60L 2260/58;
USPC .......................................................... 701/22
See application file for complete search history.

(56) References Cited

U.S. PATENT DOCUMENTS

2011/0285345 A1*  11/2011  Kawai ................. B60L 11/1811
                                                320/107
2015/0115874 A1*   4/2015  Magnusson ........... H02J 7/0052
                                                320/107

(Continued)

FOREIGN PATENT DOCUMENTS

JP      H10-290533 A     10/1998
JP      2006-054958 A    2/2006

(Continued)

OTHER PUBLICATIONS

PCT/ISA/210, "International Search Report for International Application No. PCT/JP2014/059015," Jun. 10, 2014.

(Continued)

*Primary Examiner* — McDieunel Marc
*Assistant Examiner* — James E Stroud
(74) *Attorney, Agent, or Firm* — Benjamin Hauptman; Manabu Kanesaka; Kenneth Berner (57) ABSTRACT

A charge control device determines a current value acquired by dividing a current amount that should be charged in a secondary battery in a vehicle at a charging location by an allowable charging time at the charging location on the basis of a charging amount as a physical quantity associated with the charging state of the secondary battery. When the vehicle arrives at the charging location, the charge control device allows a charging device provided at the charging location to charge the secondary battery with the current having the determined current value for the allowable charging time.

8 Claims, 6 Drawing Sheets

(52) U.S. Cl.
CPC ............... Y02T 10/7005; Y02T 10/7044;
Y02T 10/705; Y02T 10/7072; Y02T 90/14
*B60L11/1861* (2013.01); *B60L 2240/545*
(2013.01); *B60L 2240/547* (2013.01); *B60L 2240/549* (2013.01); *B60L 2240/80* (2013.01);
*B60L 2260/52* (2013.01); *B60L 2260/54*
(2013.01); *B60L 2260/58* (2013.01); *Y02T 10/705* (2013.01); *Y02T 10/7005* (2013.01);
*Y02T 10/7044* (2013.01); *Y02T 10/7072*
(2013.01); *Y02T 90/14* (2013.01)

(56) References Cited

U.S. PATENT DOCUMENTS

2015/0115891 A1* 4/2015 Sung ............... B60L 11/1824
320/109

2015/0158393 A1* 6/2015 Kawano ............... B60L 11/18
320/109

FOREIGN PATENT DOCUMENTS

| | | |
|---|---|---|
| JP | 2008-092696 A | 4/2008 |
| JP | 2008-249633 A | 10/2008 |
| JP | 4220946 B2 | 2/2009 |
| JP | 2010-023785 A | 2/2010 |
| JP | 2012-230027 A | 11/2012 |

OTHER PUBLICATIONS

PCT/ISA/237, "Written Opinion of the International Searching Authority for International Application No. PCT/JP2014/059015," Jun. 10, 2014.

* cited by examiner

CHARGE CONTROL DEVICE, CHARGE CONTROL METHOD, AND CHARGE CONTROL SYSTEM

RELATED APPLICATIONS

The present application is National Phase of International Application No. PCT/JP2014/059015 filed Mar. 27, 2014, and claims priority from Japanese Application No. 2013-076388, filed Apr. 1, 2013, the disclosure of which is hereby incorporated by reference herein in its entirety.

TECHNICAL FIELD

The present invention relates to a charge control device, a charge control method, and a charge control system for controlling the charging of a secondary battery provided in a vehicle traveling on a path including a plurality of charging locations.

BACKGROUND ART

In recent years, the evaluation of electric vehicles has increased due to the growing awareness of environmental issues. Implementation of vehicles driven by a secondary battery is highly expected since it is possible to reduce the time and effort for wiring or maintenance and to eliminate the influence on the view due to the wiring.

When introducing the secondary battery to the electric vehicle, deterioration of the secondary battery has become an issue. Specifically, the secondary battery needs to be replaced with a new secondary battery due to deterioration. In the introduction of the secondary battery, there is a problem of the cost for replacement. The progress of deterioration of the secondary battery is known to be influenced by the use range of the charging rate of the secondary battery or the temperature of the secondary battery.

Patent Literature 1 discloses a technique for suppressing the progress of deterioration associated with the use range of the charging rate of the secondary battery by performing charging so that an increase or decrease in the charging rate of the secondary battery in the path is within a predetermined range including the optimal charging rate.

CITATION LIST

Patent Literature

[PTL 1] Japanese Patent No. 0442096

SUMMARY OF INVENTION

Technical Problem

However, Patent Literature 1 does not disclose a technique for suppressing the progress of deterioration based on the temperature of the secondary battery. It is an object of the present invention to provide a charge control device, a charge control method, and a charge control system to solve the aforementioned problem.

Solution to Problem

According to an aspect of the invention, there is provided a charge control device that controls charging of a secondary battery provided in a vehicle traveling on a path including a plurality of charging locations. The charge control device includes a current value specifying unit and a charge control unit. The current value specifying unit specifies a current value, which is obtained by dividing an amount of current to charge the secondary battery of the vehicle at each of the charging locations by an allowable charging time at the charging location, based on an amount of charging that is a physical quantity relevant to a charging state of the secondary battery. The charge control unit causes a charging device provided at the charging location to charge the secondary battery of the vehicle with a current, which has the current value specified by the current value specifying unit, for the allowable charging time when the vehicle arrives at the charging location.

According to the aspect of the invention, the charge control device further includes a current value storage unit. The current value storage unit stores a current value, which is obtained by dividing the amount of current to charge the secondary battery at each charging location by an allowable charging time at the charging location, for each amount of charging of the secondary battery when the vehicle arrives at the charging location. The current value specifying unit specifies a current value, which is stored in the current value storage unit so as to be associated with a current amount of charging of the secondary battery, as a current value to charge the secondary battery of the vehicle at the charging location.

According to the aspect of the invention, In the charge control device, a current value at a certain charging location specified by the current value specifying unit is a current value obtained by dividing an optimal amount of current to charge the secondary battery at the charging location by the allowable charging time in order to set the amount of charging of the secondary battery to a predetermined target value when the vehicle arrives at an end point of the path.

According to the aspect of the invention, In the charge control device, the current value specifying unit specifies a current value of a current to charge the secondary battery based on a current state of the vehicle or the secondary battery.

According to another aspect of the invention, there is provided a charge control method of controlling charging of a secondary battery provided in a vehicle traveling on a path including a plurality of charging locations. The charge control method includes a step of specifying a current value, which is obtained by dividing an amount of current to charge the secondary battery of the vehicle at each of the charging locations by an allowable charging time at the charging location, based on an amount of charging that is a physical quantity relevant to a charging state of the secondary battery. The charge control method includes a step of causing a charging device provided at the charging location to charge the secondary battery of the vehicle with a current, which has the specified current value, for the allowable charging time when the vehicle arrives at the charging location.

According to another aspect of the invention, in the charge control method, the current value specified in the step of specifying a current value is a current value obtained by dividing an optimal amount of current to charge the secondary battery at the charging location by the allowable charging time in order to set the amount of charging of the secondary battery to a predetermined target value when the vehicle arrives at an end point of the path.

According to still another aspect of the invention, there is provided a charge control system that controls charging of a secondary battery provided in a vehicle traveling on a path including a plurality of charging locations. The charge control system includes a current amount specifying unit, a current value specifying unit, and a charge control unit. The current amount specifying unit specifies an optimal amount of current to charge the secondary battery at each of the charging locations, for each amount of charging that is a physical quantity relevant to the charging location and a charging state of the secondary battery, in order to set the amount of charging of the secondary battery to a predetermined target value when the vehicle arrives at an end point of the path. The current value specifying unit specifies a current value, which is obtained by dividing the amount of current specified by the current amount specifying unit by an allowable charging time at the charging location, based on the amount of charging of the secondary battery when the vehicle arrives at the charging location. The charge control unit causes a charging device provided at the charging location to charge the secondary battery of the vehicle with a current, which has the current value specified for the charging location and the amount of charging by the current value specifying unit, for the allowable charging time when the vehicle arrives at the charging location.

According to still another aspect of the invention, the charge control device further includes a current amount calculation unit. The current amount calculation unit, for each combination of the charging location, a starting point charging amount that is the amount of charging of the secondary battery at the charging location, and an end point charging amount that is the amount of charging of the secondary battery at a next charging location of the charging location, when the amount of charging of the secondary battery is the starting point charging amount, calculates an amount of current. The amount of current is required for charging at the charging location in order to set the amount of charging of the secondary battery to the end point charging amount when the vehicle arrives at the next charging location. The current amount specifying unit calculates a value as an evaluation value associated with the charging location and the amount of current, for each amount of current calculated by the current amount calculation unit, in order from an end point side of the path for the charging location for which an optimal amount of current has not been specified. The evaluation value is a value obtained by adding an evaluation value increasing monotonically for the amount of current and an evaluation value for the amount of charging of the secondary battery when the vehicle arrives at the next charging location of the charging location when the secondary battery is charged with the amount of current. The current amount specifying unit specifies an amount of current for which the evaluation value is the smallest as the optimal amount of current.

Advantageous Effects of Invention

The temperature of the secondary battery increases monotonically for the effective current value of the secondary battery, and the effective current value is determined depending on the sum of the squares of the effective current value. According to at least one aspect, the charge control unit supplies the current, which is obtained by dividing the amount of current specified by the current amount specifying unit by the allowable charging time, to the secondary battery. Therefore, the charge control unit can charge the secondary battery with the minimum current. The charge control unit can suppress the progress of deterioration based on the temperature of the secondary battery.

DESCRIPTION OF EMBODIMENTS

First Embodiment

Hereinafter, an embodiment of the present invention will be described in detail with reference to the diagrams.

Figure 1:
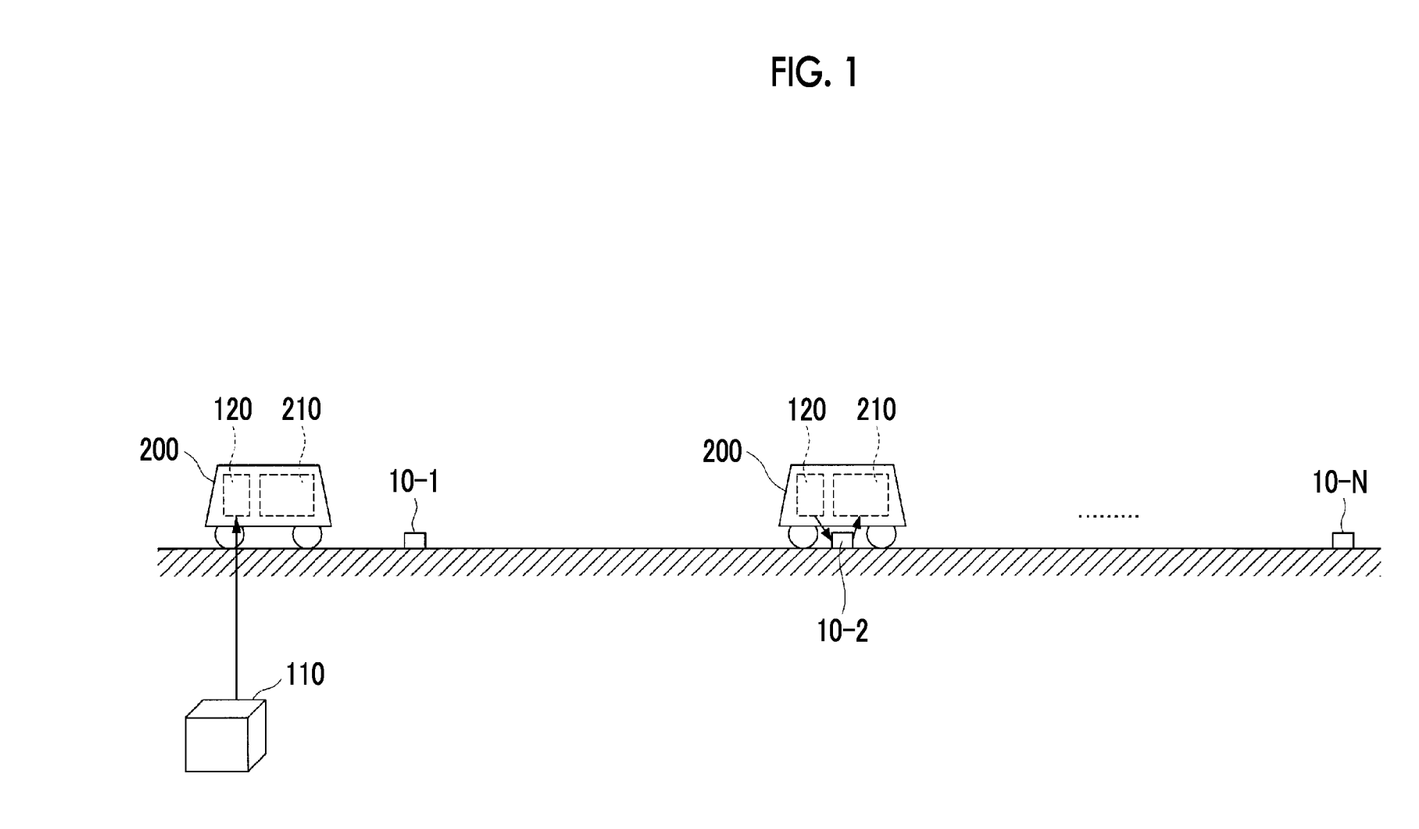
FIG. 1 is a schematic diagram showing an embodiment of a charge control system according to a first embodiment of the present invention.

FIG. 1 is a schematic diagram showing an embodiment of a charge control system 100 according to a first embodiment of the present invention.

The charge control system 100 is a system that controls the charging of a secondary battery 210. The secondary battery 210 is provided in a vehicle 200 traveling on a path. On the path, N charging locations including charging devices 10-1 to 10-N (hereinafter, referred to as a charging device 10 when the charging devices 10-1 to 10-N are collectively referred to) are provided. In the present embodiment, one of the charging locations is provided at the end point of the path.

The charge control system 100 includes a current value calculation device 110 and a charge control device 120. The current value calculation device 110 calculates an appropriate current value in the charging of the secondary battery 210 for each charging location. The charge control device 120 controls the charging of the secondary battery 210 based on the current value calculated by the current value calculation device 110. The charge control device 120 is mounted in the vehicle 200.

Figure 2:
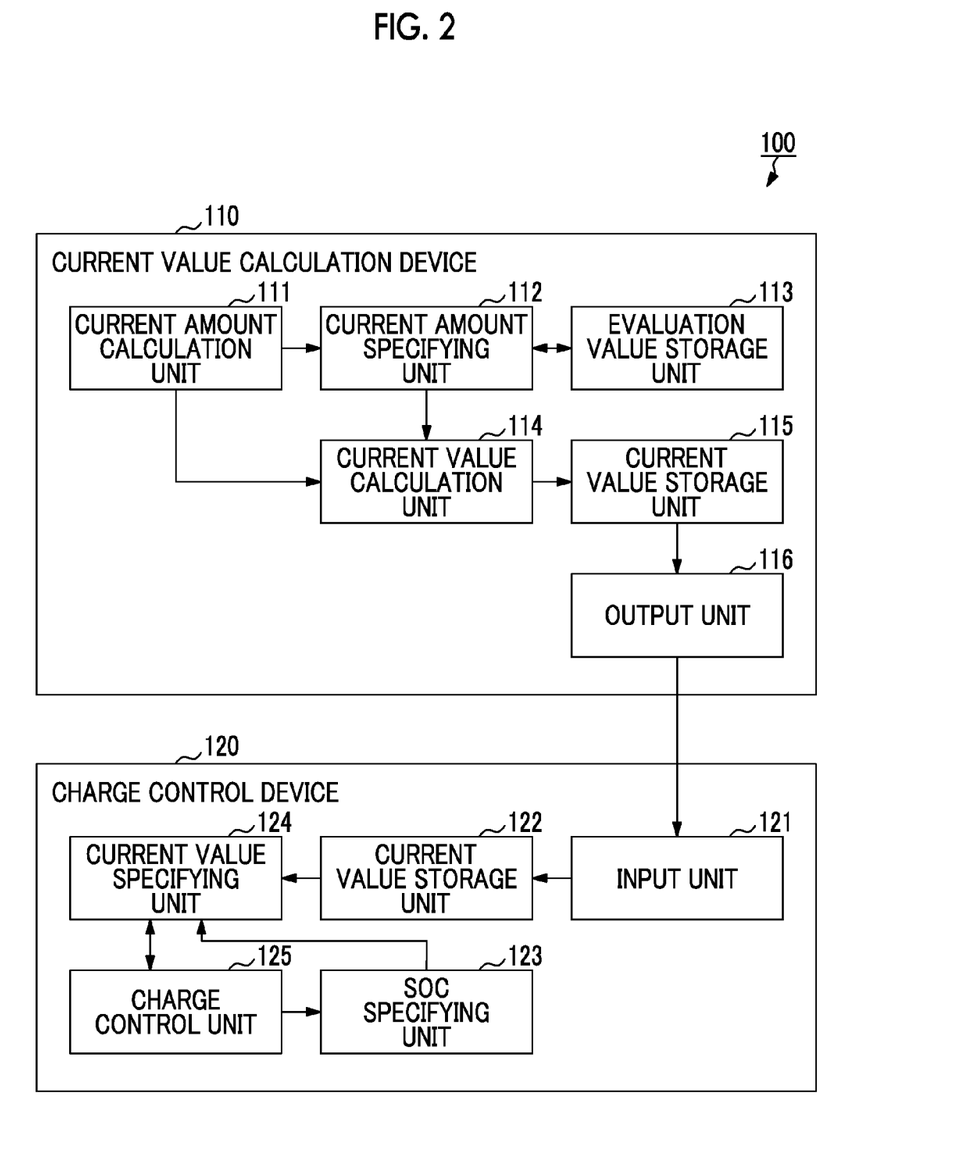
FIG. 2 is a schematic block diagram showing the configuration of the charge control system according to the first embodiment of the present invention.

FIG. 2 is a schematic block diagram showing the configuration of the charge control system 100 according to the first embodiment of the present invention.

The current value calculation device 110 includes a current amount calculation unit 111, a current amount specifying unit 112, an evaluation value storage unit 113, a current value calculation unit 114, a current value storage unit 115, and an output unit 116.

For each combination of a charging location, a state of charge (SOC) of the secondary battery 210 at the charging location (hereinafter, referred to as a starting point SOC), and the SOC of the secondary battery 210 at the next charging location of the charging location (hereinafter, referred to as an end point SOC), the current amount calculation unit 111 calculates the amount of current required for charging in order to meet the end point SOC. In the present embodiment, the above calculation is performed for each level. The level is based on the division of the SOC of the secondary battery 210 into a plurality of levels within the operating range.

For each amount of current calculated by the current amount calculation unit 111, the current amount specifying unit 112 calculates an evaluation value indicating the appropriateness of charging the secondary battery 210 with the amount of current. The current amount specifying unit 112 specifies the optimal amount of current to charge the secondary battery 210 based on the evaluation value. The smaller the evaluation value, the higher the appropriateness. The current amount specifying unit 112 records the smallest value, among the evaluation values calculated for a certain charging location and a certain starting point SOC, in the evaluation value storage unit 113 so as to be associated with the charging location and the starting point SOC.

The evaluation value storage unit 113 stores the evaluation value so as to be associated with the combination of the charging location and the starting point SOC.

For each combination of a charging location and a starting point SOC, the current value calculation unit 114 records a current value in the current value storage unit 115 so as to be associated with the charging location and the starting point SOC. The current value is a current value obtained by dividing the amount of current specified by the current amount specifying unit 112 by the allowable charging time at the charging location.

The current value storage unit 115 stores a current value, which is suitable for the charging of the secondary battery 210, so as to be associated with the combination of the charging location and the starting point SOC.

The output unit 116 outputs the current value stored in the current value storage unit 115 to the charge control device 120.

The charge control device 120 includes an input unit 121, a current value storage unit 122, an SOC specifying unit 123, a current value specifying unit 124, and a charge control unit 125.

The input unit 121 receives an input of a current value from the current value calculation device 110 for each combination of the charging location and the starting point SOC. The input unit 121 records the current value in the current value storage unit 122 so as to be associated with the charging location and the starting point SOC.

The current value storage unit 122 stores a current value, which is suitable for the charging of the secondary battery 210, so as to be associated with the combination of the charging location and the starting point SOC.

The SOC specifying unit 123 specifies the SOC of the secondary battery 210.

When the vehicle 200 arrives at a charging location, the current value specifying unit 124 reads a current value, which is associated with the charging location and the SOC of the secondary battery 210, from the current value storage unit 122.

When the vehicle 200 arrives at a charging location, the charge control unit 125 causes the charging device 10 provided at the charging location to charge the secondary battery 210 with a current having the current value read by the current value specifying unit 124 for the allowable charging time at the charging location.

That is, the current value calculation device 110 according to the present embodiment calculates a current value for optimal charging in advance for each charging location and each SOC of the secondary battery 210. Then, the charge control device 120 according to the present embodiment specifies the optimal current value, among the current values calculated in advance, according to the SOC of the secondary battery 210 when the vehicle 200 arrives at the charging location, and charges the secondary battery 210 based on the current value.

The operation of the charge control system 100 according to the present embodiment will be described.

Figure 3:
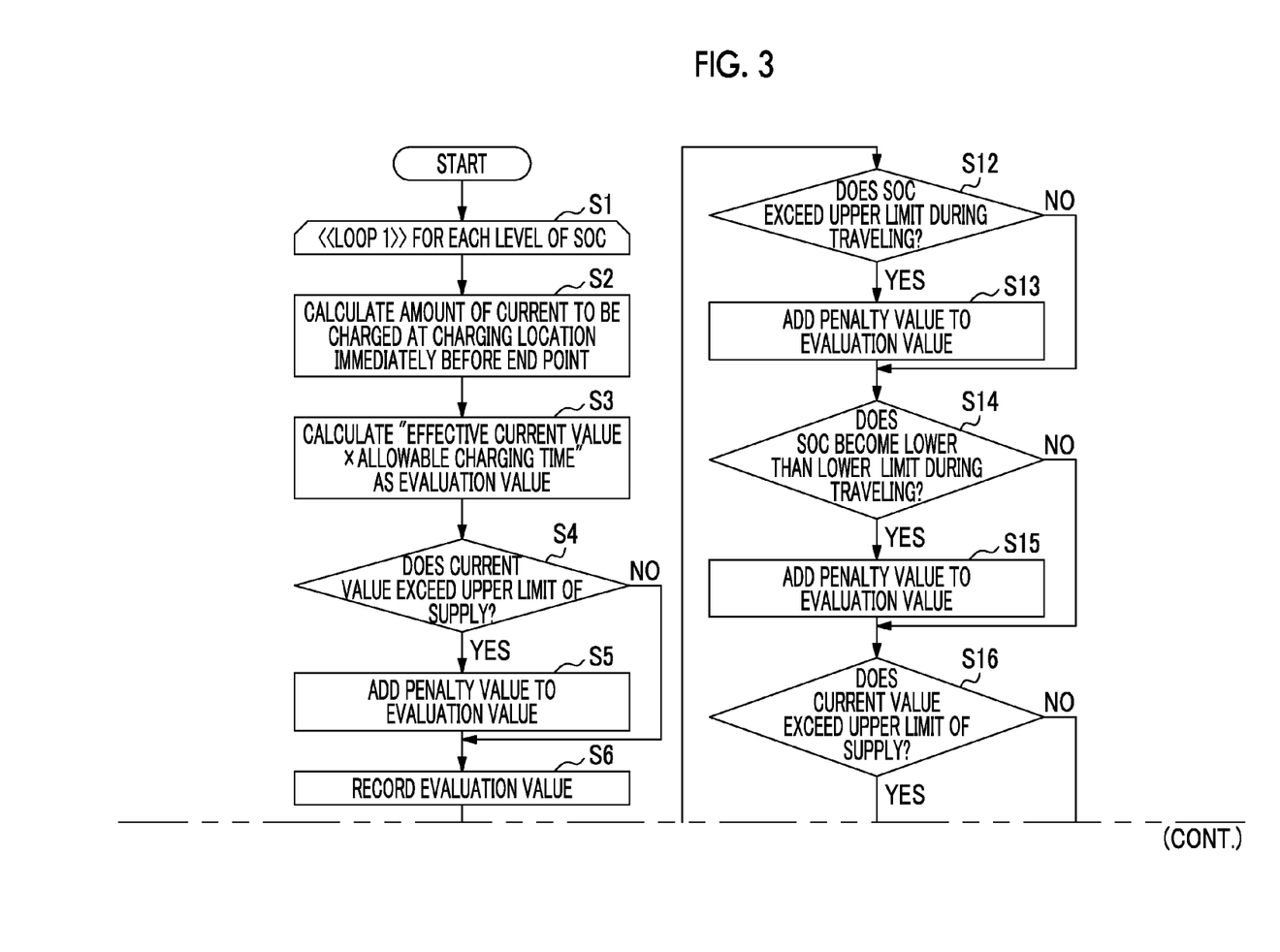
FIG. 3 is a flowchart showing the operation of a current value calculation device according to the first embodiment of the present invention.

How the current value calculation device 110 calculates a current value will be described. FIG. 3 is a flowchart showing the operation of the current value calculation device 110 according to the first embodiment of the present invention.

The current value calculation device 110 selects the levels of the SOC of the secondary battery 210 one by one. For the selected level, the current value calculation device 110 performs processing shown in steps S2 to S7 shown below (step S1). Hereinafter, the level of the SOC selected in step S1 is referred to as a j-th level.

The current amount calculation unit 111 calculates the amount of current (step S2). The amount of current is, when the SOC of the secondary battery 210 at a charging location provided at the end point, that is, at the N-th charging location, is the SOC of the j-th level, the amount of current to be charged so that the SOC of the secondary battery 210 when the vehicle 200 arrives at the end point becomes a predetermined target SOC (target value). Specifically, the current amount calculation unit 111 calculates the amount of current corresponding to the difference between the selected SOC and the target SOC.

The current amount specifying unit 112 calculates a value, which is obtained by multiplying the effective current value based on the amount of current calculated by the current amount calculation unit 111 by the allowable charging time, as an evaluation value (step S3). Specifically, the current amount specifying unit 112 calculates the evaluation value according to Expression (1).

[Expression 1]

$$F_{N,j} = \left(\frac{\Delta E_{N,j}}{T_N}\right)^2 \cdot T_N \tag{1}$$

$F_{N,j}$ indicates an evaluation value for the amount of current that the current amount calculation unit 111 calculates for the N-th charging location and the SOC of the j-th level. $\Delta E_{N,j}$ indicates the amount of current that the current amount calculation unit 111 calculates for the N-th charging location and the SOC of the j-th level. $T_N$ indicates an allowable charging time of the N-th charging location.

The current amount specifying unit 112 determines whether or not a current value obtained by dividing the amount of current $\Delta E_{N,j}$ calculated by the current amount calculation unit 111 by the allowable charging time $T_N$ at the N-th charging location exceeds the upper limit of the current value that can be supplied at the N-th charging location (step S4). When it is determined that the current value exceeds the upper limit (step S4: YES), the current amount specifying unit 112 adds a predetermined penalty value to the evaluation value calculated in step S3 (step S5). The current amount specifying unit 112 uses a sufficiently greater value than the evaluation value, such as a greater value than a value that can be the evaluation value, as the penalty value. On the other hand, when it is determined that the current value does not exceed the upper limit (step S4: NO), the current amount specifying unit 112 does not add the penalty value to the evaluation value.

The current amount specifying unit 112 records the calculated evaluation value in the evaluation value storage unit 113 so as to be associated with the charging location provided at the end point and the SOC selected in step S1 (step S6).

The current value calculation unit 114 calculates a current value by dividing the amount of current $\Delta E_{N,j}$ calculated by the current amount calculation unit 111 by the allowable charging time $T_N$ at the N-th charging location. The current value calculation unit 114 records the current value in the current value storage unit 115 so as to be associated with the combination of the N-th charging location and the SOC of the j-th level (step S7).

When the processing of steps S1 to S7 described above has been performed for all levels of the SOC, the current value calculation device 110 selects charging locations whose charge values are not recorded in a charge value storage unit one by one in order from the end point side of the path. For the selected charging location, the current value calculation device 110 performs processing shown in steps S9 to S20 shown below (step S8). That is, the current value calculation device 110 selects the charging locations in order of (N−1)-th charging location, (N−2)-th charging location, . . . , first charging location. Hereinafter, the charging location selected in step S8 is referred to as the i-th charging location.

When the charging location has been selected in step S8, the current value calculation device 110 further selects one level of the starting point SOC and one level of the end point SOC of the secondary battery 210. For the combination of the selected levels, the current value calculation device 110 performs processing shown in steps S10 to S20 shown below (step S9). Hereinafter, the starting point SOC selected in step S9 is referred to as a j-th SOC, and the end point SOC selected in step S9 is referred to as a k-th SOC.

When the starting point SOC at the charging location selected in step S8 is the SOC of the j-th level, the current amount calculation unit 111 calculates the amount of current to be charged at the charging location in order to set the end point SOC to the SOC of the k-th level (step S10). Specifically, the current amount calculation unit 111 calculates the amount of current by adding the amount of current, which is required for traveling from the i-th charging location to the (i+1)-th charging location, to the amount of current corresponding to the difference between the SOC of the j-th level and the SOC of the k-th level.

The current amount specifying unit 112 reads an evaluation value, which is associated with the combination of the (i+1)-th charging location and the SOC of the k-th level, from the evaluation value storage unit 113. The current amount specifying unit 112 calculates an evaluation value for the amount of current $\Delta E_{i,j}$ calculated by the current amount calculation unit 111 in step S10 (step S11). The evaluation value is calculated by adding the evaluation value read by the current amount specifying unit 112 to the value obtained by multiplying the effective current value based on the amount of current calculated by the current amount calculation unit 111 by the allowable charging time. Specifically, the current amount specifying unit 112 calculates the evaluation value according to Expression (2).

[Expression 2]

$$F_{i,j} = F_{i+1,k} + \left(\frac{\Delta E_{i,j}}{T_i}\right)^2 \cdot T_i \quad (2)$$

Then, when the secondary battery 210 is charged with the amount of current $\Delta E_{i,j}$ calculated by the current amount calculation unit 111 and the vehicle 200 travels from the i-th charging location to the (i+1)-th charging location, the current amount specifying unit 112 determines whether or not the SOC of the secondary battery 210 is equal to or greater than the upper limit of the operating range during traveling (step S12). Specifically, the current amount specifying unit 112 determines whether or not a value, which is obtained by adding the SOC of the j-th level, the SOC corresponding to the amount of current $\Delta E_{i,j}$ calculated by the current amount calculation unit 111, and a maximum value $\Delta Emax_i$ of the variation in the SOC of the secondary battery 210 while the vehicle 200 is traveling from the i-th charging location to the (i+1)-th charging location, is equal to or greater than the upper limit of the operating range.

Figure 4:
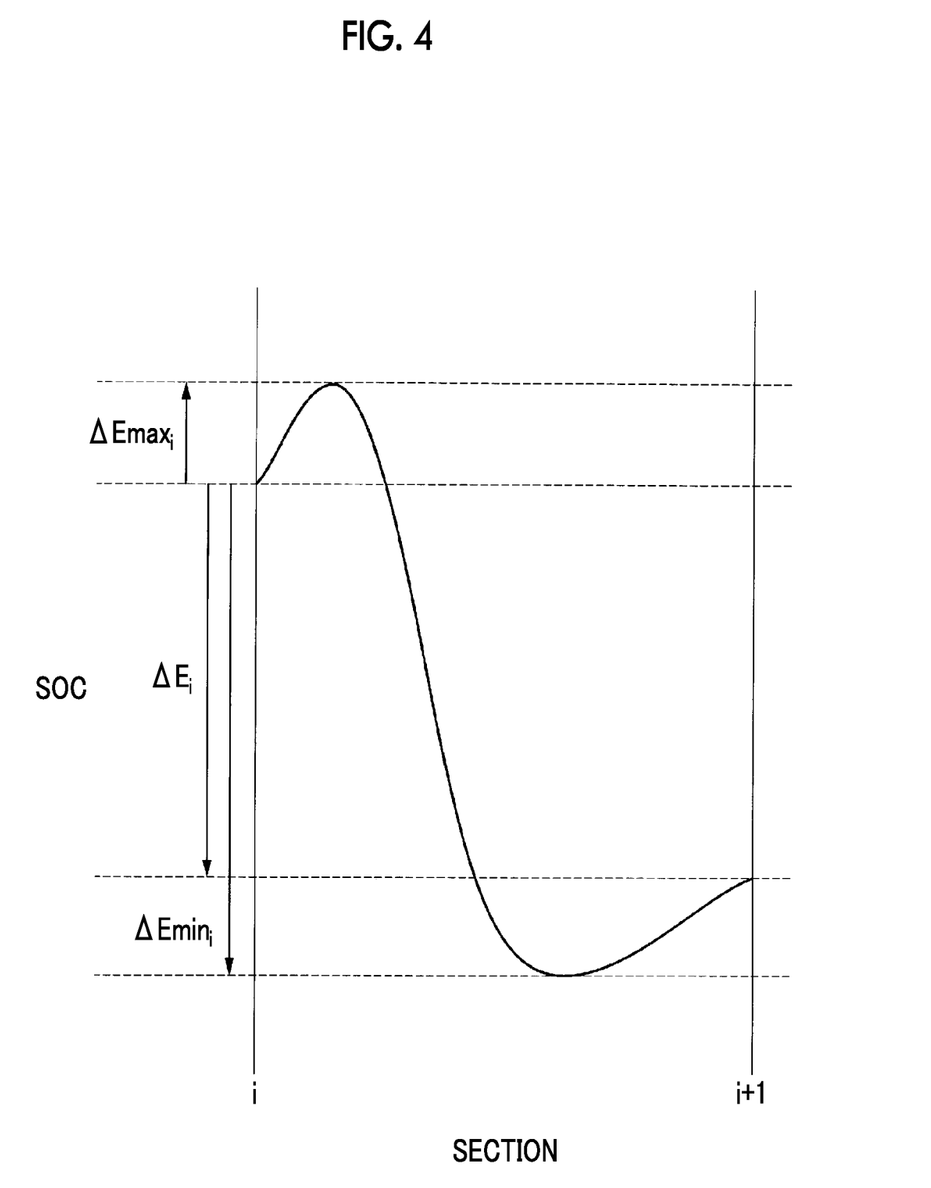
FIG. 4 is a diagram showing an example of the variation in the SOC of a secondary battery according to the traveling of a vehicle.

Here, the variation in the SOC of the secondary battery 210 according to the traveling of the vehicle 200 will be described. FIG. 4 is a diagram showing an example of the variation in the SOC of the secondary battery 210 according to the traveling of the vehicle 200.

When traveling in a certain section, the vehicle 200 performs one of the behaviors of accelerating, coasting, and braking. When the vehicle 200 is accelerating, the SOC of the secondary battery 210 is reduced since the electric power charged in the secondary battery 210 is consumed. On the other hand, when the vehicle 200 brakes, the SOC of the secondary battery 210 is increased since the regenerative power due to braking is supplied to the secondary battery 210. The vehicle 200 consumes more power than usual when traveling uphill. When traveling downhill, the vehicle 200 consumes less power than usual, or regenerative power is supplied to the secondary battery 210. That is, the gradient of the path along which the vehicle 200 travels affects the increase or decrease in the SOC. Therefore, as shown in FIG. 4, the SOC of the secondary battery 210 may be temporarily higher than the SOC before traveling, or may be temporarily lower than the SOC after traveling.

A traveling pattern when the vehicle 200 travels from the i-th charging location to the (i+1)-th charging location is determined in advance. On the other hand, the SOC required for the vehicle 200 to travel in the traveling pattern differs depending on the number of passengers in the vehicle 200, power consumption of auxiliary devices according to the season, or the like. In the present embodiment, the current value calculation device 110 specifies, based on traveling under the worst conditions, $\Delta E_i$ that is the SOC required for traveling from the i-th charging location to the (i+1)-th charging location and a maximum value $\Delta Emax_i$ and a minimum value $\Delta Emin_i$ of the variation in the SOC of the secondary battery 210 according to the traveling of the vehicle 200. Therefore, the current value calculation device 110 can specify the current value that does not deviate from the operating range of the SOC even under the worst conditions.

When the current amount specifying unit 112 determines that the SOC of the secondary battery 210 is equal to or greater than the upper limit of the operating range during traveling in step S12 (step S12: YES), the current amount specifying unit 112 adds a predetermined penalty value to the evaluation value calculated in step S11 (step S13). On the other hand, when it is determined that the SOC of the secondary battery 210 is not equal to or greater than the upper limit of the operating range during traveling (step S12: NO), the current amount specifying unit 112 does not add the penalty value to the evaluation value.

Then, when the secondary battery 210 is charged with the amount of current $\Delta E_{i,j}$ calculated by the current amount calculation unit 111 and the vehicle 200 travels from the i-th charging location to the (i+1)-th charging location, the current amount specifying unit 112 determines whether or not the SOC of the secondary battery 210 is equal to or less than the lower limit of the operating range during traveling (step S14). Specifically, the current amount specifying unit 112 determines whether or not a value, which is obtained by adding the SOC of the j-th level, the SOC corresponding to the amount of current $\Delta E_{i,j}$ calculated by the current amount calculation unit 111, and a minimum value $\Delta E\min_i$ of the variation in the SOC of the secondary battery 210 while the vehicle 200 is traveling from the i-th charging location to the (i+1)-th charging location, is equal to or less than the lower limit of the operating range. As shown in FIG. 4, the minimum value of the variation in the SOC of the secondary battery 210 is generally a negative value.

When the current amount specifying unit 112 determines that the SOC of the secondary battery 210 is equal to or less than the lower limit of the operating range during traveling in step S14 (step S14: YES), the current amount specifying unit 112 adds a predetermined penalty value to the evaluation value calculated in step S11 (step S15). On the other hand, when it is determined that the SOC of the secondary battery 210 is not equal to or less than the lower limit of the operating range during traveling (step S14: NO), the current amount specifying unit 112 does not add the penalty value to the evaluation value.

Then, the current amount specifying unit 112 determines whether or not a current value obtained by dividing the amount of current $\Delta E_{i,j}$ calculated by the current amount calculation unit 111 by the allowable charging time $T_i$ at the i-th charging location exceeds the upper limit of the current value that can be supplied at the i-th charging location (step S16). When it is determined that the current value exceeds the upper limit (step S16: YES), the current amount specifying unit 112 adds a predetermined penalty value to the evaluation value calculated in step S11 (step S17). On the other hand, when it is determined that the current value does not exceed the upper limit (step S16: NO), the current amount specifying unit 112 does not add the penalty value to the evaluation value.

Then, the current amount specifying unit 112 determines whether or not the evaluation value calculated this time is smaller than the evaluation value that is previously stored in the evaluation value storage unit 113 so as to be associated with the combination of the i-th charging location and the SOC of the j-th level (step S18). When the evaluation value associated with the combination of the i-th charging location and the SOC of the j-th level is not recorded in the evaluation value storage unit 113, the evaluation value calculated this time is treated as a value smaller than the evaluation value that is previously stored.

When it is determined that the evaluation value calculated this time is smaller than the evaluation value that is previously stored in the evaluation value storage unit 113 so as to be associated with the combination of the i-th charging location and the SOC of the j-th level (step S18: YES), the current amount specifying unit 112 records the evaluation value calculated this time in the evaluation value storage unit 113 by overwriting the evaluation value calculated this time so as to be associated with the combination of the i-th charging location and the SOC of the j-th level (step S19). The current value calculation unit 114 calculates a current value by dividing the amount of current $\Delta E_{i,j}$ calculated by the current amount calculation unit 111 by the allowable charging time $T_i$ at the i-th charging location. The current value calculation unit 114 records the current value in the current value storage unit 115 by overwriting the current value so as to be associated with the combination of the i-th charging location and the SOC of the j-th level (step S20).

On the other hand, when the evaluation value calculated this time is not smaller than the evaluation value that is previously stored in the evaluation value storage unit 113 so as to be associated with the combination of the i-th charging location and the SOC of the j-th level (step S18: NO), the current amount specifying unit 112 and the current value calculation unit 114 do not record the evaluation value and the current value.

The current value calculation device 110 can specify the amount of current, for which the evaluation value is the lowest, for each combination of the charging location and the starting point SOC by performing the above processing of steps S9 to S20 for all combinations of the starting point SOC and the end point SOC. That is, a current value calculated based on the amount of current for which the evaluation value is the lowest is recorded in the current value storage unit 115.

When the current value calculation device 110 has performed the above processing of steps S8 to S20 for all combinations of the starting point SOC and the end point SOC and all charging locations, the output unit 116 outputs all combinations of the charging location, SOC, and current value, which are stored in the current value storage unit 115, to the charge control device 120 (step S21).

The method of calculating the evaluation value by the current value calculation device 110 will be described by way of a specific example. The example described below is an example in a case where the SOC is divided into seven levels and each current value is calculated for the path in which two charging locations are provided. In this example, the upper limit of the current value that can be supplied by the charging device 10 provided at the charging location is 3 Ampere. In this example, the allowable charging time at each charging location is 1 second. In this example, the SOC required for traveling from the first charging location to the second charging location is the SOC of the first level. In this example, the target SOC at the end point is the SOC of the fifth level. The charging device 10 in this example can charge the SOC of the first level by performing charging with a 1-Ampere current for 1 second.

In step S2, for the second charging location, the current amount calculation unit 111 calculates the amount of current, which is required for charging in order to set the SOC at the end point to the SOC of the fifth level, for each SOC of the 0-th to sixth levels. The amount of current required for the charging of the SOC of the 0-th level is 5 Ampere seconds. The amount of current required for the charging of the SOC of the first level is 4 Ampere seconds. The amount of current required for the charging of the SOC of the second level is 3 Ampere seconds. The amount of current required for the charging of the SOC of the third level is 2 Ampere seconds. The amount of current required for the charging of the SOC of the fourth level is 1 Ampere seconds. When the SOC of the secondary battery 210 is the SOC of the fifth and sixth levels, charging is not necessary.

Then, in steps S3 to S5, the current amount specifying unit 112 calculates an evaluation value for each level of the SOC. The amount of current required for the charging of the SOC of the 0-th and first levels exceeds the upper limit of the amount of current that can be supplied by the charging device 10. Therefore, the evaluation value associated with the amount of current becomes a significantly large value ($\alpha$) to which the penalty value has been added. The evaluation value associated with the amount of current required for the charging of the SOC of the second level is 9. The evaluation value associated with the amount of current required for the charging of the SOC of the third level is 4. The evaluation value associated with the amount of current required for the charging of the SOC of the fourth level is 1. When the SOC of the secondary battery 210 is the SOC of the fifth and sixth levels, the evaluation value is 0. The current amount specifying unit 112 records these evaluation values in the evaluation value storage unit 113.

The current amount calculation unit 111 selects the first charging location in step S8, and calculates the amount of current and the evaluation value for each combination of the starting point SOC and the end point SOC in step S9.

The current amount calculation unit 111 selects the SOC of the 0-th level as the starting point SOC, and selects the SOC of the 0-th level as the end point SOC. In this case, the required amount of current is 1 Ampere second. The evaluation value is a value obtained by adding α (sufficiently large value), which is an evaluation value associated with the SOC of the 0-th level at the second charging location, to 1 that is the effective current value. Here, the current amount specifying unit 112 records the evaluation value in the evaluation value storage unit 113 so as to be associated with the first charging location and the SOC of the 0-th level.

The current amount calculation unit 111 selects the SOC of the 0-th level as the starting point SOC, and selects the SOC of the first level as the end point SOC. In this case, the required amount of current is 2 Ampere seconds. The evaluation value is a value obtained by adding α, which is an evaluation value associated with the SOC of the first level at the second charging location, to 4 that is the effective current value.

Then, the current amount calculation unit 111 selects the SOC of the 0-th level as the starting point SOC, and selects the SOC of the second level as the end point SOC. In this case, the required amount of current is 3 Ampere seconds. The evaluation value is 18 that is a value obtained by adding 9, which is an evaluation value associated with the SOC of the second level at the second charging location, to 9 that is the effective current value. Here, since the evaluation value is a value smaller than the previously calculated evaluation value, the current amount specifying unit 112 overwrites and records the evaluation value in the evaluation value storage unit 113 so as to be associated with the first charging location and the SOC of the 0-th level.

Hereinafter, the current amount calculation unit 111 selects the SOC of the third to sixth levels as the end point SOC and sequentially calculates the evaluation value in the same manner. In this example, however, since all evaluation values are greater than 18, overwriting recording into the evaluation value storage unit 113 is not performed. Thus, the current amount specifying unit 112 can record the evaluation value, which is the lowest value, in the evaluation value storage unit 113.

Figure 5:
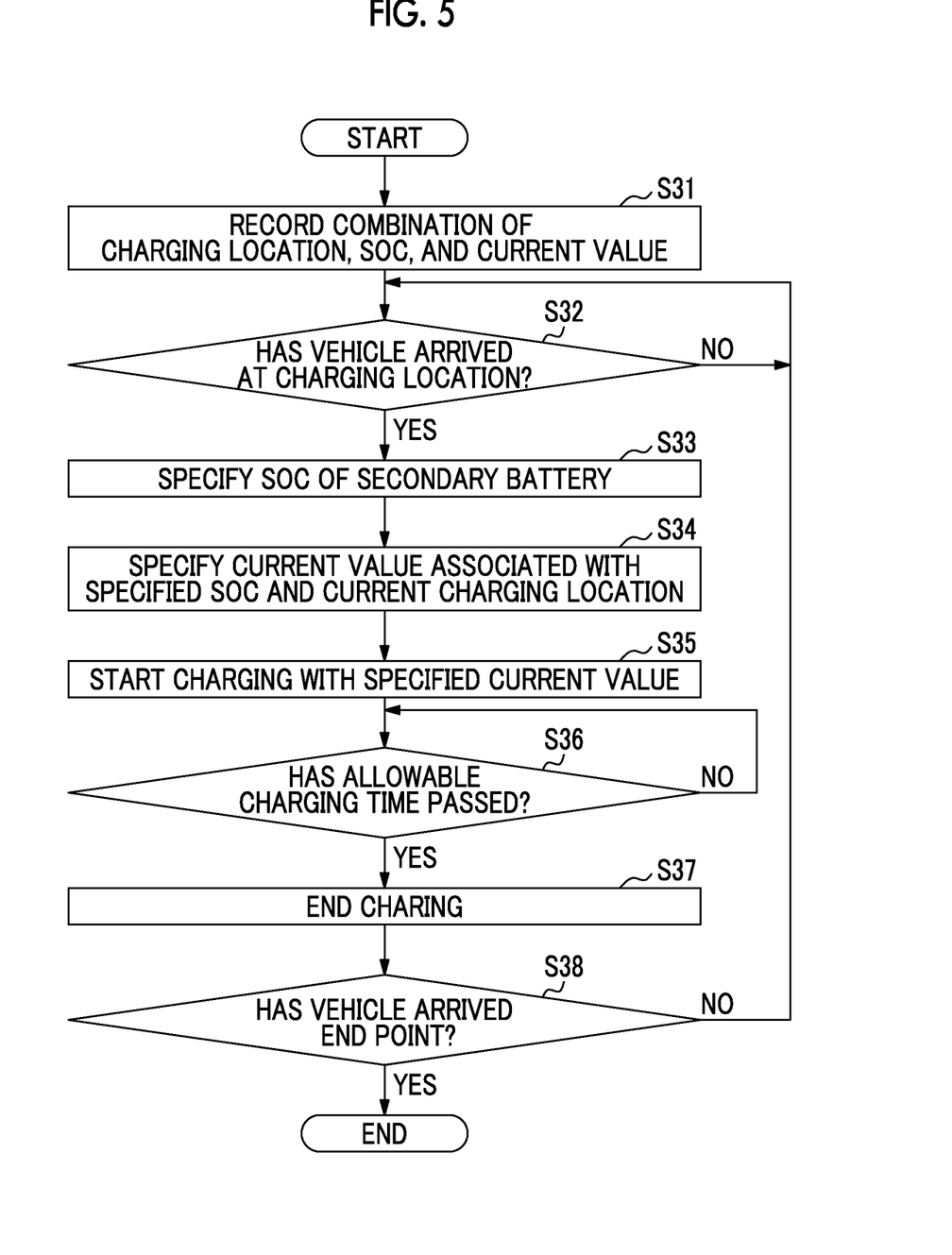
FIG. 5 is a flowchart showing the operation of a charge control device according to the first embodiment of the present invention.

The operation of the charge control device 120 according to the present embodiment will be described. FIG. 5 is a flowchart showing the operation of the charge control device 120 according to the first embodiment of the present invention.

When the current value calculation device 110 outputs a combination of charging location, SOC, and current value, the charge control device 120 receive the input of the information and records the information in the current value storage unit 122 (step S31).

The charge control unit 125 determines whether or not the vehicle 200 including the charge control device 120 mounted therein has arrived at the charging location (step S32). When the charge control unit 125 determines that the vehicle 200 has not arrived at the charging location (step S32: NO), the process returns to step S32 to continue the determination regarding whether or not the vehicle 200 has arrived at the charging location.

On the other hand, when the charge control unit 125 determines that the vehicle 200 including the charge control device 120 mounted therein has arrived at the charging location (step S32: YES), the SOC specifying unit 123 specifies the SOC of the secondary battery 210 mounted in the vehicle 200 (step S33). Specifically, the SOC specifying unit 123 may estimate an open-circuit voltage from the voltage of the secondary battery 210 and specify the SOC corresponding to the open-circuit voltage as the SOC of the secondary battery 210. The SOC specifying unit 123 may calculate an integrated value of the current to charge and discharge the secondary battery 210 and specify the SOC of the secondary battery 210 based on the integrated value.

The current value specifying unit 124 reads a current value, which is associated with the combination of the charging location when it is determined that the vehicle 200 has arrived in step S32 and the SOC specified by the SOC specifying unit 123, from the current value storage unit 122 (step S34). The charge control unit 125 causes the charging device 10 provided at the charging location to charge the secondary battery 210 with a current having the current value read by the current value specifying unit 124 (step S35).

The charge control unit 125 determines whether or not the allowable charging time at the charging location has passed from the start time of charging (step S36). When it is determined that the allowable charging time has not passed from the start time of charging (step S36: NO), the charge control unit 125 continues the charging. On the other hand, when it is determined that the allowable charging time has passed from the start time of charging (step S36: YES), the charge control unit 125 stops the charging of the charging device 10 (step S37).

The charge control unit 125 determines whether or not the charging location where the vehicle 200 has stopped is the end point of the path (step S38). When the charge control unit 125 determines that the charging location where the vehicle 200 has stopped is not the end point of the path (step S38: NO), the process returns to step S32 to determine whether or not the vehicle 200 has arrived at the next charging location. On the other hand, when the charge control unit 125 determines that the charging location where the vehicle 200 has stopped is the end point of the path (step S38: YES), the charge control process is ended.

Thus, according to the present embodiment, the charge control device 120 charges the secondary battery 210 with a current value, which is obtained by dividing the amount of current to charge the secondary battery 210 of the vehicle 200 at the charging location by the allowable charging time, for the allowable charging time. Therefore, it is possible to minimize the effective current value when charging the secondary battery 210 with the amount of current to charge the secondary battery 210 of the vehicle 200 at the charging location. The temperature of the secondary battery increases monotonically for the effective current value. Therefore, the charge control device 120 can suppress the progress of deterioration based on the temperature of the secondary battery 210 by minimizing the effective current value.

According to the present embodiment, the charge control device 120 includes the current value storage unit 122 that stores an optimal current value for charging so as to be associated with each charging location and SOC. The charge control device 120 performs charging with the current value stored in the current value storage unit 122. Therefore, the charge control device 120 can specify the optimal current value quickly without a need to perform complicated calculations online.

In the present embodiment, the current value at a certain charging location specified by the current value specifying unit 124 is a current value obtained by dividing the optimal amount of current to charge the secondary battery 210 at the charging location by the allowable charging time in order to set the SOC of the secondary battery 210 to a predetermined target SOC when the vehicle 200 arrives at the end point of the path. Therefore, the current value specifying unit 124 can set the SOC to the target SOC by controlling the charging according to the current value specified by the charge control device 120 so that the generation of heat in the secondary battery 210 is minimized at the end point of the path.

Second Embodiment

The current value calculation device 110 according to the first embodiment calculates a current value based on the worst conditions so as not to deviate from the operating range of the secondary battery 210. On the other hand, a current value calculation device 110 according to a second embodiment generates the relationship among the charging location, the SOC, and the current value for each state of the vehicle 200 or the secondary battery 210. As examples of the state of the vehicle 200 or the secondary battery 210, the number of passengers in the vehicle 200, power consumption of auxiliary devices (air conditioner, heater, and the like), the degree of deterioration of the secondary battery 210, and the like can be mentioned, for example. The current value specifying unit 124 of the charge control device 120 specifies the state of the vehicle 200 or the secondary battery 210 whenever the vehicle 200 arrives at the charging location. The current value specifying unit 124 specifies a current value associated with the state.

In this case, the current value specifying unit 124 may correct the relationship among the charging location, the SOC, and the current value based on the measurement data according to the time zone or season after the start of the system operation.

According to the present embodiment, it is possible to appropriately reduce the effective current value and the SOC use range of the secondary battery 210 according to the state of the vehicle 200 or the secondary battery 210. Therefore, it is possible to suppress the progress of deterioration of the secondary battery 210. In particular, for a state in which an abrupt change does not occur within the time width of one day, such as power consumption of auxiliary devices according to the season or the degree of deterioration of the secondary battery 210, it can be said that the effect of reducing the effective current value is large.

While some embodiments of the invention have been described in detail with reference to the diagrams, the specific configuration is not limited to those described above, and various design changes and the like can be made within the scope not departing from the subject matter of the invention.

For example, although the amount of charging that is a physical quantity relevant to the charging state of the secondary battery 210 is expressed as the SOC in the embodiments described above, the present invention is not limited thereto. For example, even if the amount of charging is expressed as the capacity of the secondary battery 210 or the open-circuit voltage, it is possible to obtain the same effect.

In addition, although the charge control device 120 includes the current value storage unit 122 and the charge control unit 125 controls the charging of the secondary battery 210 with the current value stored in the current value storage unit 122 in the embodiments described above, the present invention is not limited thereto. For example, a current amount storage unit that stores the amount of current specified by the current amount specifying unit 112 may be provided instead of the current value storage unit 122. The current value specifying unit 124 may specify the current value by dividing the amount of current read from the current amount storage unit by the allowable charging time.

In addition, although the current value calculation device 110 and the charge control device 120 are separately provided in the embodiments described above, the present invention is not limited thereto, and one device in which these devices are integrally formed may be used. In this case, this device may calculate an appropriate current value online without providing the current value storage unit 122.

In the embodiments described above, in the calculation of the evaluation value, the current value calculation device 110 adds a penalty value after calculating the evaluation value based on the effective current value. However, the present invention is not limited thereto. For example, the current value calculation device 110 may add the evaluation value based on the effective current value after calculating the penalty value previously.

In addition, although the current value calculation device 110 calculates the amount of current and the evaluation value in order from the end point of a plurality of charging locations on the path using a dynamic programming method, the present invention is not limited thereto. The current value calculation device 110 may use other optimal solution calculation methods as long as they are methods of calculating the optimal amount of current to set the SOC of the secondary battery 210 when the vehicle 200 arrives at the end point of the path to the target SOC.

The current value calculation device 110 may be configured to be able to select one of a mode, in which the method of the present invention is applied, and a mode, in which a conventional charging method is applied, depending on the situation, in consideration of a significant variation in travel time due to traffic congestion, an accident, or the like.

Each of the current value calculation device 110 and the charge control device 120 described above has a computer system thereinside. The operation of each processing unit described above is stored in a computer-readable recording medium in the form of a program, and the above-described processing is performed when the computer reads and executes the program. Here, the computer-readable recording medium refers to a magnetic disk, a magneto-optic disc, a CD-ROM, a DVD-ROM, a semiconductor memory, and the like. The computer program may be distributed to the computer through the communication line, and the computer that receives the distribution may execute the program.

The above-described program may be provided to realize some of the functions described above. In addition, the program may be a so-called differential file (differential program) that can realize the above functions in combination with a program previously recorded in a computer system.

REFERENCE SIGNS LIST

100: charge control system
110: current value calculation device
111: current amount calculation unit
112: current amount specifying unit
113: evaluation value storage unit
114: current value calculation unit
115: current value storage unit
116: output unit
120: charge control device 121: input unit
122: current value storage unit
123: SOC specifying unit
124: current value specifying unit
125: charge control unit

The invention claimed is:

1. A charge control device that controls charging of a secondary battery provided in a vehicle traveling on a path including a plurality of charging locations, comprising:
a current value specifying unit that specifies a current value of the secondary battery based on a present amount of charging when the vehicle arrives at each of the charging locations, the currently value being obtained by dividing an amount of current to charge the secondary battery of the vehicle at each of the charging locations by an allowable charging time at the charging location, the allowable charging time being preset, the present amount of charging being a physical quantity relevant to a charging state of the secondary battery; and
a charge control unit that causes a charging device provided at the charging location to charge the secondary battery of the vehicle with a current, which has the current value specified by the current value specifying unit, for the allowable charging time.

2. The charge control device according to claim 1, further comprising:
a current value storage unit that stores a current value, which is obtained by dividing the amount of current to charge the secondary battery at each charging location by an allowable charging time at the charging location, for each amount of charging of the secondary battery when the vehicle arrives at the charging location,
wherein the current value specifying unit specifies a current value, which is stored in the current value storage unit so as to be associated with a present amount of charging of the secondary battery, as a current value to charge the secondary battery of the vehicle at the charging location.

3. The charge control device according to claim 1,
wherein a current value at a certain charging location specified by the current value specifying unit is a current value obtained by dividing an optimal amount of current to charge the secondary battery at the charging location by the allowable charging time in order to set the amount of charging of the secondary battery to a predetermined target value when the vehicle arrives at an end point of the path.

4. The charge control device according to claim 1,
wherein the current value specifying unit specifies a current value of a current to charge the secondary battery based on a present state of the vehicle or the secondary battery.

5. A charge control method of controlling charging of a secondary battery provided in a vehicle traveling on a path including a plurality of charging locations, comprising:
a step of specifying a current value of the secondary battery based on a present amount of charging when the vehicle arrives at each of the charging locations, the current value being obtained by dividing an amount of current to charge the secondary battery of the vehicle at each of the charging locations by an allowable charging time at the charging location, the allowable charging time being preset, the present amount of charging being a physical quantity relevant to a charging state of the secondary battery; and
a step of causing a charging device provided at the charging location to charge the secondary battery of the vehicle with a current, which has the specified current value, for the allowable charging time.

6. The charge control method according to claim 5,
wherein the current value specified in the step of specifying a current value is a current value obtained by dividing an optimal amount of current to charge the secondary battery at the charging location by the allowable charging time in order to set the amount of charging of the secondary battery to a predetermined target value when the vehicle arrives at an end point of the path.

7. A charge control system that controls charging of a secondary battery provided in a vehicle traveling on a path including a plurality of charging locations, comprising:
a current amount specifying unit that specifies an optimal amount of current to charge the secondary battery at each of the charging locations, for each amount of charging that is a physical quantity relevant to the charging location and a charging state of the secondary battery, in order to set the amount of charging of the secondary battery to a predetermined target value when the vehicle arrives at an end point of the path;
a current value specifying unit that specifies a current value based on a present amount of charging when the vehicle arrives at each of the charging locations, the current value being obtained by dividing the amount of current specified by the current amount specifying unit by an allowable charging time at the charging location, the allowable charging time being preset; and
a charge control unit that causes a charging device provided at the charging location to charge the secondary battery of the vehicle with a current, which has the current value specified for the charging location and the amount of charging by the current value specifying unit, for the allowable charging time.

8. The charge control device according to claim 7, further comprising:
a current amount calculation unit that, for each combination of the charging location, a starting point charging amount that is the amount of charging of the secondary battery at the charging location, and an end point charging amount that is the amount of charging of the secondary battery at a next charging location of the charging location, when the amount of charging of the secondary battery is the starting point charging amount, calculates an amount of current required for charging at the charging location in order to set the amount of charging of the secondary battery to the end point charging amount when the vehicle arrives at the next charging location,
wherein the current amount specifying unit calculates a value obtained by adding an evaluation value increasing monotonically for the amount of current and an evaluation value for the amount of charging of the secondary battery when the vehicle arrives at the next charging location of the charging location when the secondary battery is charged with the amount of current, as an evaluation value associated with the charging location and the amount of current, for each amount of current calculated by the current amount calculation unit, in order from an end point side of the path for the charging location for which an optimal amount of current has not been specified, and specifies an amount of current for which the evaluation value is the smallest as the optimal amount of current.

* * * * *